US010069768B2

(12) United States Patent
Underwood et al.

(10) Patent No.: US 10,069,768 B2
(45) Date of Patent: Sep. 4, 2018

(54) SYSTEM AND METHOD FOR FACILITATING THE GROWTH OF A MOBILE COMMUNITY (75) Inventors: John Anthony Underwood, Makati (PH); Christopher Edward Keys, Makati (PH); Markku Kero, Muntinlupa (PH); Rainer Leinonen, Makati (PH)

(73) Assignee: Phenix Investment Management Ltd, Road Town (VG)

( * ) Notice: Subject to any disclaimer, the term of this patent is extended or adjusted under 35 U.S.C. 154(b) by 748 days.

(21) Appl. No.: 12/866,021

(22) PCT Filed: Jul. 2, 2009

(86) PCT No.: PCT/SG2009/000240
§ 371 (c)(1),
(2), (4) Date: Aug. 3, 2010

(87) PCT Pub. No.: WO2010/002355
PCT Pub. Date: Jan. 7, 2010

(65) Prior Publication Data
US 2010/0317322 A1 Dec. 16, 2010

(30) Foreign Application Priority Data

Jul. 4, 2008 (SG) ............... 200805067-6

(51) Int. Cl.
*G06F 17/30* (2006.01)
*H04L 12/58* (2006.01)
(Continued)

(52) U.S. Cl.
CPC ............ *H04L 51/04* (2013.01); *G06Q 10/10* (2013.01); *H04L 51/38* (2013.01); *H04W 8/18* (2013.01)

(58) Field of Classification Search
USPC ........................................... 707/792
See application file for complete search history.

(56) References Cited

U.S. PATENT DOCUMENTS 6,018,688 A 1/2000 Schmidt
6,018,766 A 1/2000 Samuel et al.
(Continued)

FOREIGN PATENT DOCUMENTS

CN 101146057 A 4/2011
JP 2007-287131 A2 11/2007
(Continued)

OTHER PUBLICATIONS

Extended European Search Report, dated Jul. 5, 2016, for corresponding European application No. 09773868.

*Primary Examiner* — Syling Yen
*Assistant Examiner* — Bao Tran
(74) *Attorney, Agent, or Firm* — Ziegler IP Law Group, LLC (57) ABSTRACT A system and method for automatically matching a plurality of mobile subscribers is disclosed. The system includes at least one server for receiving from each mobile subscriber within the plurality of mobile subscribers a contact list. Said server is adapted to process the contact list to produce a set of normalised contact information for each subscriber in the system; compare the set normalised contact information for a selected subscriber with a subscriber network identification assigned to each subscriber with the system; identify subscriber network identifications that match entries contained in the set normalised contact information of said selected subscriber; compile a listing of the matched subscriber network identifications; and forward an invite to each subscriber within the listing of matched subscriber network identifications.

32 Claims, 7 Drawing Sheets (51) Int. Cl.
*G06Q 10/10* (2012.01)
*H04W 8/18* (2009.01)

(56) References Cited

U.S. PATENT DOCUMENTS

| | | | |
|---|---|---|---|
| 7,327,723 B2* | 2/2008 | Kurganov | H04M 3/42153 370/352 |
| 2004/0006548 A1 | 1/2004 | Mahmood | |
| 2004/0193601 A1* | 9/2004 | Hu | G06Q 10/10 |
| 2005/0044152 A1* | 2/2005 | Hardy et al. | 709/206 |
| 2005/0182745 A1* | 8/2005 | Dhillon et al. | 707/1 |
| 2006/0136584 A1* | 6/2006 | Decker et al. | 709/224 |
| 2006/0195422 A1* | 8/2006 | Cadiz | G06Q 10/10 |
| 2007/0093234 A1* | 4/2007 | Willis | G06F 21/6245 455/410 |
| 2007/0100944 A1* | 5/2007 | Ford et al. | 709/206 |
| 2007/0150444 A1 | 6/2007 | Chesnais et al. | |
| 2007/0250566 A1 | 10/2007 | Appleman et al. | |
| 2007/0270127 A1* | 11/2007 | Santoro et al. | 455/411 |
| 2008/0065755 A1* | 3/2008 | Caspi et al. | 709/224 |
| 2008/0243789 A1* | 10/2008 | Kussmaul et al. | 707/3 |
| 2009/0157732 A1* | 6/2009 | Hao et al. | 707/102 |
| 2009/0280777 A1* | 11/2009 | Doherty | H04M 1/66 455/411 |
| 2010/0184453 A1* | 7/2010 | Ohki | G01C 21/362 455/456.3 |
| 2012/0244885 A1* | 9/2012 | Hefetz | G06Q 20/32 455/456.2 |
| 2016/0232531 A1* | 8/2016 | Hefetz | G06Q 20/4014 |

FOREIGN PATENT DOCUMENTS

| | | |
|---|---|---|
| JP | 2008-048259 | 2/2008 |
| JP | 2008-048259 A | 2/2008 |
| KR | 10-2005-0045964 | 5/2005 |
| WO | WO 2006121863 A2 | 11/2006 |
| WO | WO 2008030729 A2 | 3/2008 |

* cited by examiner

SYSTEM AND METHOD FOR FACILITATING THE GROWTH OF A MOBILE COMMUNITY

CROSS-REFERENCE TO RELATED APPLICATIONS

This application is a U.S. National Phase application, under 35 U.S.C. § 371, of International Application no. PCT/SG2009/000240, with an international filing date of Jun. 2, 2009 and claims benefit of Singapore Application no. 200805067-6 filed on Jul. 4, 2008, and which are hereby incorporated by reference for all purposes.

FIELD OF THE INVENTION

The present application relates to systems and methods for facilitating the growth of a mobile community. In particular although not exclusively the present invention relates to providing an enhanced instant messaging experience within a mobile communications network.

DISCUSSION OF THE BACKGROUND ART

Recent years have seen the migration of message services such as instant messaging and email to the mobile communications environment. In the standard desktop environment Instant Messaging (IM) provided real-time text-based or near real-time communication between two or more participants over a network. Thus the key distinction between IM from such services as email is the perceived synchronicity of the communication between users, messaging is done in real or near real-time. Instant messages are typically logged in a local message history which closes the gap to the persistent nature of emails and facilitates quick exchange of information like URLs or document snippets (which can be unwieldy when communicated via telephone). IM allows effective and efficient communication, featuring immediate receipt of acknowledgment or reply.

Mobile Instant Messaging (MIM) differs slightly to that of standard desktop IM application. MIM is a presence enabled messaging service which attempts to transpose the desktop messaging experience to the usage scenario of being on the move. While several of the core ideas of the desktop experience on one hand apply to a connected mobile device, others do not. For example some of the form factor and mobility related differences need to be taken into account in order to create a really adequate, powerful and yet convenient mobile experience such as bandwidth, memory size, availability of media formats, keypad based input, screen output, CPU performance and battery power are core issues that are not confronted by desktop device users and even nomadic users with connected network.

The primary goal of any Instant Messaging application is to create a large community of users, who subsequently will remain loyal to the provider of community services. The incentive for creating the largest possible community of users from the service providers stand point is to maximise the amount of revenue through greater utilisation of their infrastructure. From the users stand point the incentive to build a community relates more to social interaction. Indeed the relationship between the user and service provider is somewhat symbiotic, the greater the number of users the greater the number of services a provider can afford to offer. However, with most mobile messaging clients as well as internet based messaging clients, a new user is often presented with a completely empty Buddy list. This presents a serious disincentive to a new user from becoming an active user of the messaging client, which in turn affects the growth of the community.

Clearly it would be advantageous to provide a system and method that would enable the matching of users of various mobile messaging clients in seamless and cost effective manner to facilitate the growth of a community of mobile users.

SUMMARY OF THE INVENTION

Accordingly in one aspect of the present invention there is provided a system for automatically matching mobile subscribers said system including:

at least one server for receiving from each mobile subscriber within the system a contact list, whereon said server is adapted to:

process the contact list to produce a set of normalised contact information for each subscriber in the system;

compare the set of normalised contact information for a selected subscriber with a subscriber network identification assigned to each subscriber with the system;

identify subscriber network identifications that match entries contained in the set normalised contact information of said selected subscriber;

compile a listing of the matched subscriber network identifications; and forward an invite to each subscriber within the listing of matched subscriber network identifications.

Preferably the server further includes a client application, wherein said client application is adapted to perform a sequential read of the contact list of each mobile subscriber and forward the information to the server.

Preferably each mobile subscriber batches multiple contacts before forwarding them to the server.

The upload of the contact list to the server may be performed visibly (with the ongoing status visible to the subscriber), or transparently. A client application may be provided to manage the transfer of the contact list to the server. Preferably the client performs a sequential read operation of the contact list on the subscriber's mobile device and uploads batches of one or more entries in the contact list as they are read to the server. The client may automatically restart upload of the contact list in the event of interruption from the last entry read.

Preferably the server is further adapted to duplicate the contact list received from each mobile subscriber and store an unaltered version of the contact list. The server may then provide the unaltered copy to the relevant subscriber upon a request from the subscriber. In the event that the server receives a request from a subscriber to provide the unaltered version of the contact list, server forwards a copy of the unaltered contact list to the subscriber in a manner that does not overwrite existing entries in the subscriber's mobile device that match entries in the server based contact list. The server may also update the information contained in its version of the contact list on identifying new entries in the current contact list stored on subscriber's mobile device.

The set of normalised contact information may include a set of normalised phone numbers extracted from the contact list of each subscriber. Preferably the set of normalised phone numbers are produce by storing only the first 7 digits, reading from right to left, of the complete phone number stored in the contact list.

In a scenario where one subscriber is known to another but the reverse cannot to be proven, the server may be adapted to initiate a call to action for the subscriber holding the contact to request the creation of a Buddy relationship with that contact. Preferably the invite and acceptance are in the form of system messages to the users' client device application. Alternately the server may create an entry in the buddy list of the subscriber holding the contact which allows communication but not the sharing of presence information.

The server may be further adapted to compare a set of normalised contact information of the selected subscriber with a set of normalised contact information of another subscriber to determine if the respective subscriber network identifications of the selected subscriber and the another subscriber are contained in the respective set of normalised contact information of the selected and another subscribers. In the case where the subscriber network identifications are contained in the respective set of normalised contact information the server adds the another subscriber to the buddy list of the selected subscriber and the selected subscriber to a buddy list associated with the another subscriber on determining that the set of normalized contact information of the selected subscriber contains the another subscriber's network identification and the another subscriber's set normalised contact information contains the selected subscribers network identification.

The server may also permit the addition to the buddy list of all contacts not identified as existing members of the community as a special category of buddy ("phonebook buddies"). These buddies may be communicated with using a subset of overall communication options and may not participate in presence sharing.

Where phonebook buddies are added as above, the server is preferably programmed to automatically convert phonebook buddies to community buddies when that party joins the community.

Further where a buddy entry of any type is added by this process to a user's buddy list the server is preferably configured to incorporate all information from the original phonebook entry.

The system may further include a suitable set of security measures to ensure proper identification of subscribers and prevent fraudulent repeated attempts to register (for example as may be attempted to obtain free trial periods as offered to new subscribers). In order to identify fraudulent registration attempts the server may be adapted to perform a multipass comparative process. The multipass operation may include the following functions:
removing subscribers (SIM/MINs) that have been active in the network for more than predetermined period of time;
comparing the number of entries in the contact list of a selected subscriber with the number of entries contained in the entire server;
comparing the first name fields of the first and last five entries with all the entries contained in the server;
comparing mobile number fields of first and last five entries using first-name/last-name as a key for comparing all entries contained in the system;
producing a mapping of the contact list and comparing mapping to all entries contained in the server.
comparing the first name fields of the first and last five entries with the all entries contained in the server;
comparing mobile number fields of first and last five entries using first-name/last-name as a key all entries contained in the system;
producing a mapping of the contact list and comparing mapping to all entries contained in the server.

If at each pass a match is returned the registration is regarded as fraudulent and treated accordingly.

The system may allow a subscriber to enter contact information for one or more external sources, such as contact information held by the subscriber on a third party website or third party service, other computing devices held by the subscriber etc.

In another aspect of the present invention there is provided a method for automatically matching a mobile subscriber in a network said method including the step of:
receiving at, at least one server, a contact list from each mobile subscriber within the network;
processing each contact list to produce a set of normalised contact information for each subscriber in the system;
comparing the set of normalised contact information for a selected subscriber with each subscriber identification in the system;
identifying subscriber identifications that match entries contained in the set normalised contact information of said selected subscriber;
compiling a listing of the matched subscriber identifications; and
forwarding invite messages to each subscriber within the listing of subscriber identifications.

Suitably the method further includes the step of sequentially reading each entry in a subscribers contact list and forwarding each entry as it is read to the server.

Preferably the method further includes the step of restoring a complete buddy list incorporating all phonebook as well as buddy information to the subscriber's mobile device.

Optionally the method further includes the step of duplicating the contact list received from each subscriber and storing an unaltered version of the contact list on the server. The method may also include the step of restoring the unaltered contact list to the subscriber's mobile device.

The method may also include the steps of receiving an acknowledgment from one or more subscribers of acceptance of invites and compiling a buddy list for the selected subscriber composed of the one or more subscribers who accept the invite. Preferably the step of comparing includes comparing a set of normalised contact information for a selected subscriber with a set of normalised contact information of another subscriber to determine if the subscriber network identifications of the subscribers being compared are contained in the set of normalised contact information for each of the compared subscribers and automatically adding the relevant subscriber information to the buddy list of the each of the compared subscriber on identifying the set of normalised contact information contain the relevant subscriber network identifications.

BRIEF DETAILS OF THE DRAWINGS

In order that this invention may be more readily understood and put into practical effect, reference will now be made to the accompanying drawings, which illustrate preferred embodiments of the invention, and wherein.

DESCRIPTION OF EMBODIMENTS OF THE INVENTION

The most immediate source of buddies for a mobile phone based messaging application is the phonebook or contact list of the mobile subscriber. The applicant has devised a process whereby Buddy lists are automatically populated through the comparison of the mobile numbers and phonebooks of multiple parties, in order to deduce existing relationships between various parties. This process the applicant has termed Auto Buddy Matching (ABM).

In the context of the following description, the term 'phonebook buddy' may be used interchangeably as the phrase 'other contact'. The terms 'community buddy' and 'one way' buddy are used in the context of full matches and partial matches.

Figure 1:
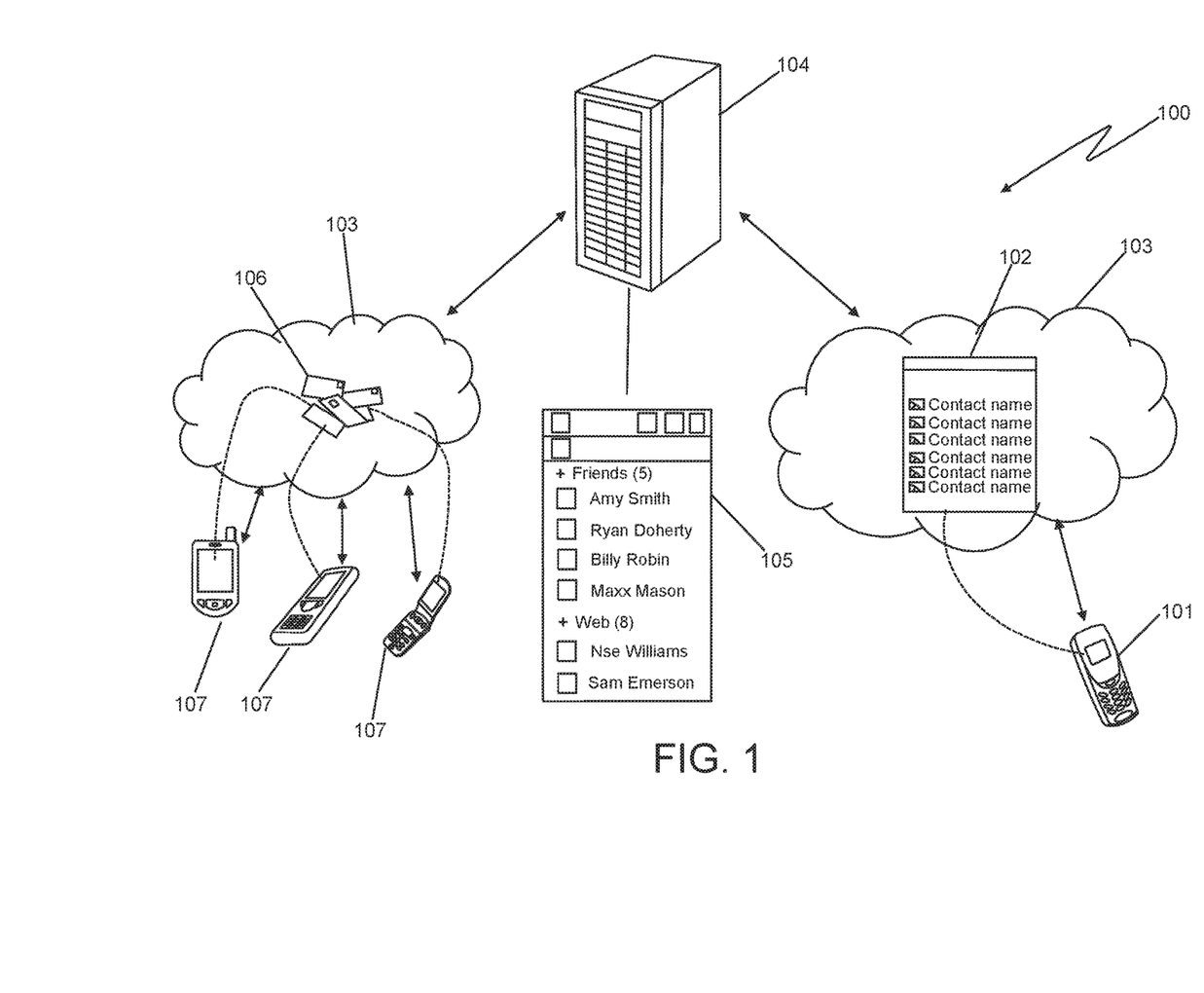
FIG. 1 is a schematic diagram of system for facilitating auto matching of mobile subscribers according to one embodiment of the present invention.

As shown in FIG. 1 a system 100 for Auto Matching (AM) according to one embodiment of the present invention, as shown mobile subscriber 101 is able to upload the contents of their mobile phonebook 102, via network 103, to server 104. The server then processes the received data to produce a buddy list 105. The server can then optionally send out invites 106 to each of the contacts 107 saved to the buddy list 105.

As noted above the first step in AM process is to obtain a copy of each mobile subscriber's phonebook. This requires agreement from each subscriber to upload the phonebook to the server. The upload process can be performed visibly (with the ongoing status visible to the subscriber), or transparently behind the scenes.

Figure 2:
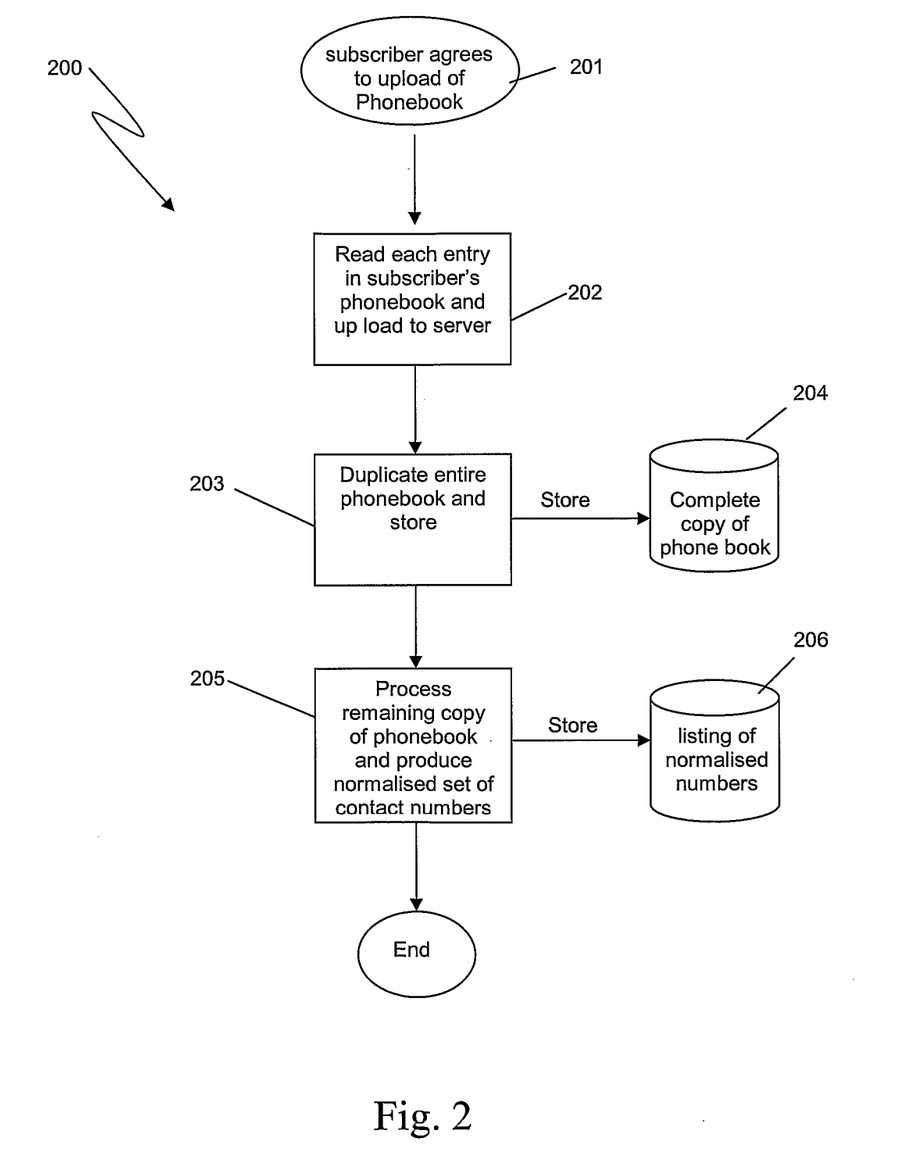
FIG. 2 is a flow diagram of the process for uploading and storing contact information to facilitate auto matching of mobile subscribers according to one embodiment of the present invention.

One example of the upload and the manner in which post processing of the subscriber's phonebook 200 occurs at the server is shown in FIG. 2. Once the subscriber agrees to upload 201, a client application is employed to read each entry and store it on the server 202. Once the entire contents of the subscriber's phonebook are uploaded the server duplicates the phonebook 203, and stores a first copy 204 of the phonebook. The first copy is maintained "as-is" with all fields and data maintained in their original format. This copy is intended to act as the source for a phonebook restore should it be required. The second copy is passed through a pre-processing stage 204 where the mobile numbers are extracted from the phonebook and only the first 7 digits (counting from the right to left) are stored 205. This provides a consistent formatting of the mobile number for use in the latter comparison with the phonebooks of other subscribers within the network.

As mentioned above a client application manages the uploading process to the server. The client application sequentially reads through the phonebook data (in the background) and uploads the data to the server. In the event of an interruption to the process the client program automatically restarts the upload from where it was interrupted.

The server accepts each phonebook entry (item) and optionally processes it based on the following rules:

| Scenario | Rule |
| --- | --- |
| Item uploaded is not present on server | Add new item to the stored phonebook data for the subscriber. |
| Item uploaded is identical to that present on the server | No action required |
| Item uploaded has some matching criteria: First-name and last-name number(s) | Identify possible matching items. Offer subscriber on the mobile client a view of the matching items and ask which to retain (options are to retain one, selected or all items |
| Item held on server is no longer present on mobile device phonebook | Identify as a possible deleted item. Offer subscriber on the mobile client a view of the possible deleted item and ask them if they wish to remove the item from the server phonebook. Options are yes or no. |

Alternately the server accepts all entries. No deletes are processed except specifically deletes of entries in the buddy list.

If the upload process is interrupted by the subscriber (for example if they shut down their client while it is running) the process is automatically restarted when the client restarts. The invention may incorporate the ability to automatically update the phonebook on a time basis or change basis. In certain embodiments of the present invention, a subscriber's phonebook may be refreshed automatically to the server on a monthly basis so that new contacts will be included in matching. In certain embodiments of the present invention the subscriber has the option to manually refresh/upload their phonebook. In other embodiments, the subscribers phonebook may be monitored continuously and updates may be uploaded as soon as they are made.

Preferably when a subscriber requests a restore of their phonebook, the client application initiates a restore using the complete set of buddy information. In this iteration of the invention, the buddy list incorporates all buddy and phonebook data. Usefully the buddy list presents a readymade repository for all a user's contacts which can be easily maintained by the user.

Optionally when the subscriber requests a restore of their phonebook from a backed up phonebook file held on the server, the client application initiates a restore of phonebook data from the server. The following rules are applied to phonebook entries when restoring back to the mobile device phonebook:

| Scenario | Rule |
| --- | --- |
| Item restored is not present on mobile device | Add new item to the mobile device phonebook. |
| Item being restored is identical to that present on the mobile device | No action required |
| Item being restored has some matching criteria: First-name and last-name number(s) | Identify possible matching items. Offer subscriber on the mobile client a view of the matching items and ask which to retain on their mobile device (options are to retain one entry, selected entries or all entries |
| Item held on mobile device is not present on the server backup. | Identify as a possible deleted item. Offer subscriber on the mobile client a view of the possible deleted items and ask them if they wish to remove the item from the mobile device phonebook. Options are yes or no. |

Figure 3:
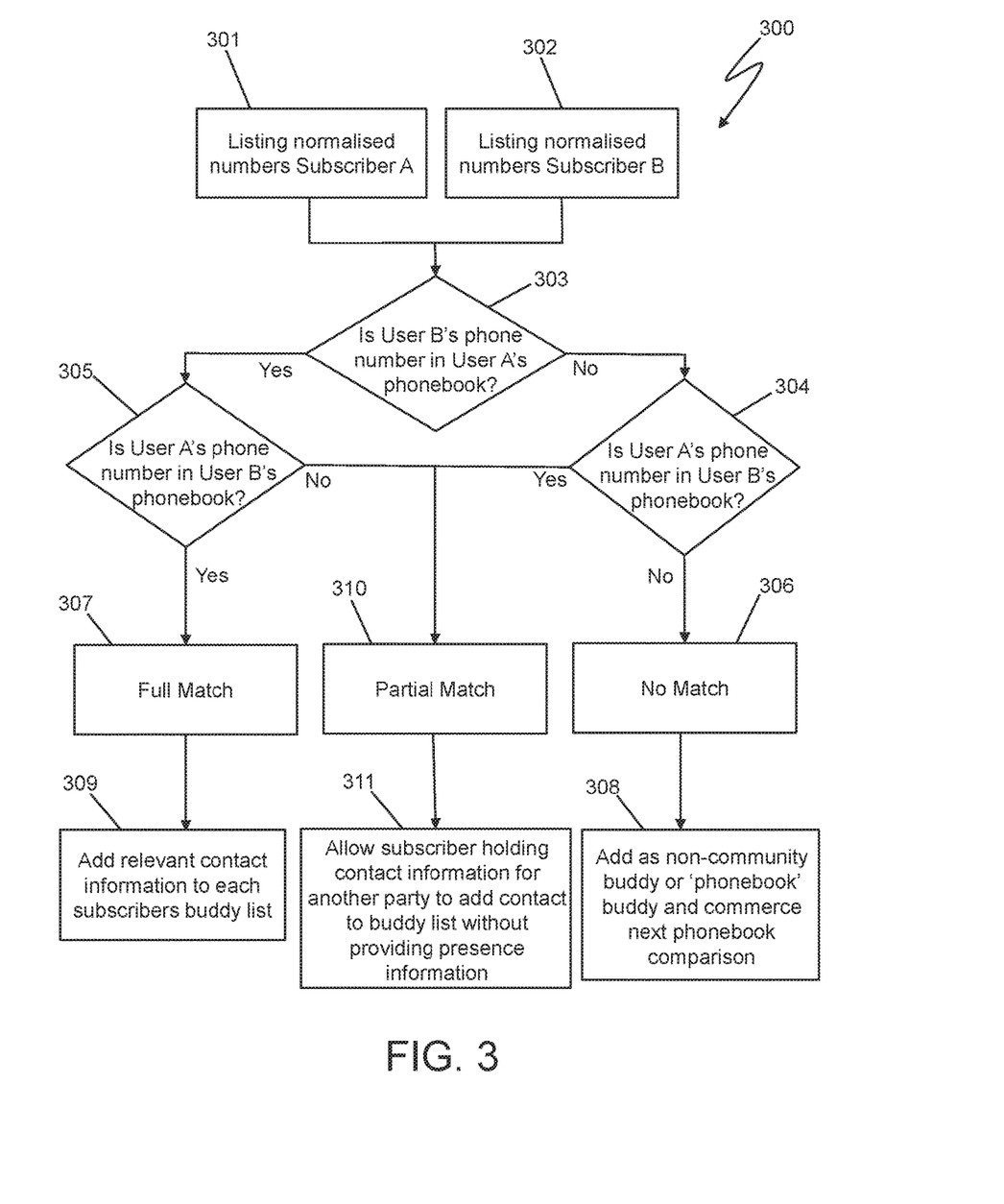
FIG. 3 is a flow diagram of the auto matching process according to one embodiment of the present invention.

FIG. 3 depicts the matching/comparison process 300 according to one embodiment of the present invention. Matching is performed between a subscriber's phonebook contacts and the mobile numbers of all existing subscribers in the subscriber database, matching may be performed automatically or on request by the subscriber.

In this particular example the phonebooks of subscribers A 301 and B 302 are compared. Firstly the system determines if determines subscriber B's phone number is contained in subscriber A's phonebook 303. If subscriber B's phone number is in subscriber A's phonebook the system interrogates the "level" of the match by determining if subscriber A's number is contained in subscriber B's phonebook 305. If subscriber A's number is in subscriber B's phonebook, then a "full" match condition 307 exists. In this instance the system has determined that both parties know each other and automatically adds each to the other's Buddy list 309. No further subscriber intervention is required. This is different to PC type messaging platforms that are never able to identify this type of match and can never avoid a full and sometimes troublesome approval process.

In the event that subscriber B's number is not subscriber A's phonebook the system interrogates subscriber B's phonebook to determine if subscriber A's number is contained in subscriber B's phonebook 304. When a match is identified as one-way i.e. subscriber A has subscriber B's mobile number in their phonebook but subscriber B does not have information relating subscriber A in their phonebook or vice versa a "partial" match condition 310 exist. The policy in a partial match case is not to provide presence and status information to a subscriber regarding the matching part that they do not already have in their possession. Hence in this instance subscriber B is added to subscriber A's buddy list but A is not added to B's buddy list (or vice versa). In this instance a person holding contact information for another party is provided with a buddy to whom they can communicate—but presence information is not provided. Further in this scenario, if Buddy A sends a message to B, then B has the option to add A as a buddy (making the relationship a two-way presence relationship) or block them from sending further messages. Thus an invitation becomes implicit in sending a message where the relationship is "one-way".

Examples of presence and status information that would not be shared could be status message and profile picture.

A no match condition 306 is declared when subscriber A's phonebook contains no information regarding subscriber B and vice versa. In such an instance the system determines that the two parties do not know one another. In this instance the entry that is not matched is added as a non-community buddy or "phonebook buddy" before the system proceeds to compare subscriber A's phone book with that of another subscriber 308 and so on until each subscriber phone book has been compared to each phonebook stored on the server.

Whether buddies are added as full, one-way or phonebook buddies, all information originally held by the user in their phonebook is maintained and added as additional data to the buddy in the buddy list. This additional data is not made available to other community members but is visible and maintainable by the user as a complete server based repository of their contacts as well as to facilitate the restore process.

Figure 4:
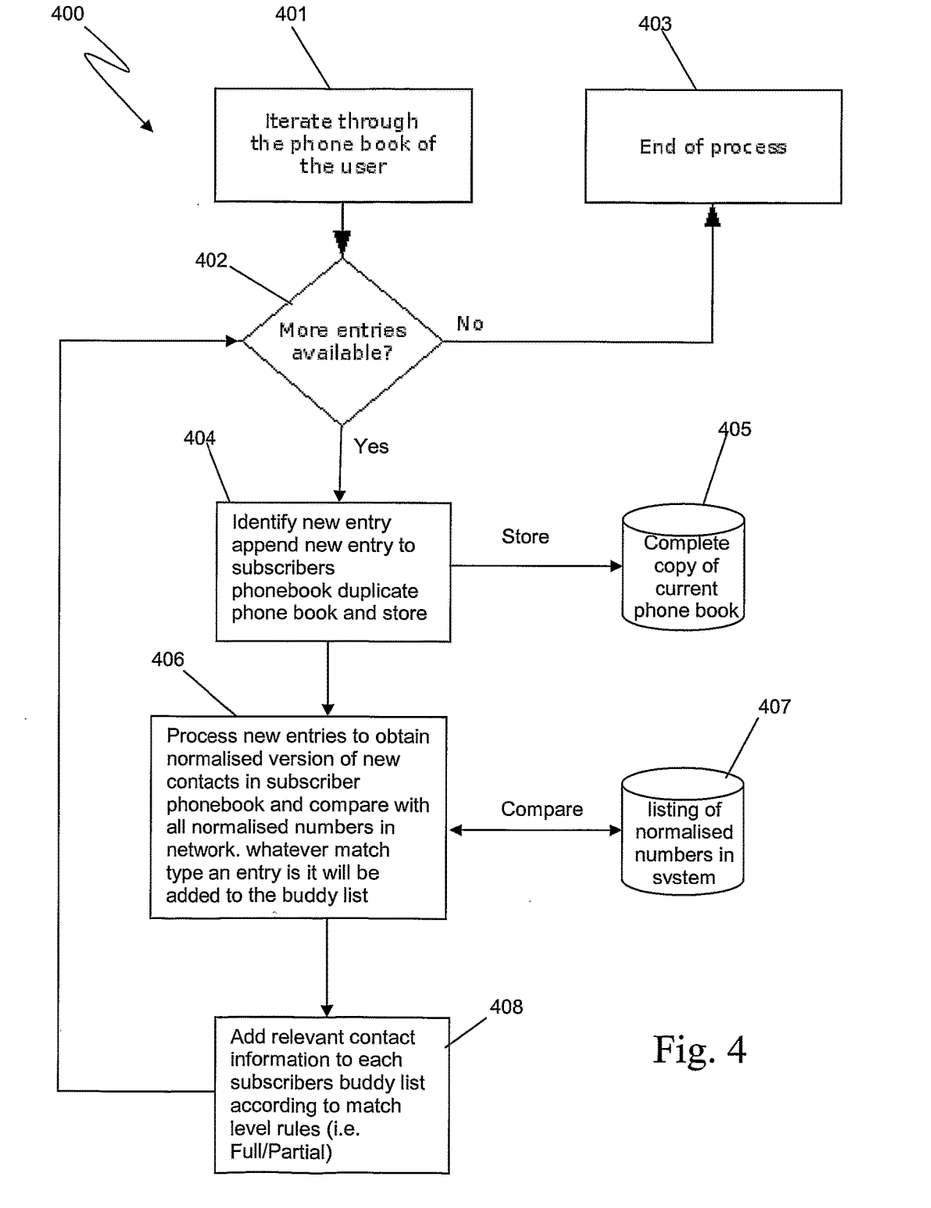
FIG. 4 is a flow diagram of the auto matching process initiated during an update of the subscriber's contact list according to one embodiment of the present invention.
Figure 5:
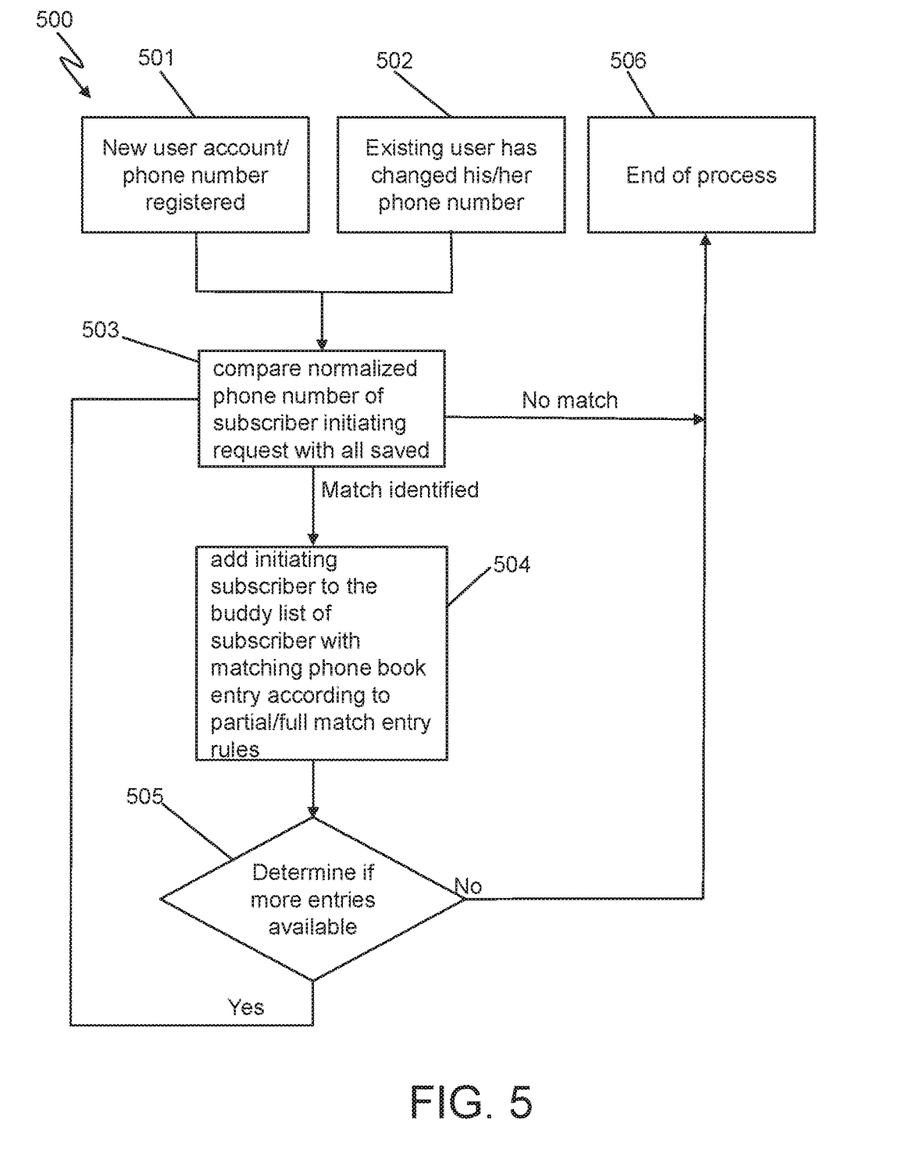
FIG. 5 is a flow diagram of the auto matching process according to one embodiment of the present invention initiated during registration of new subscriber and or a change in a subscriber ID of previously register subscriber according to one embodiment of the present invention.

As mentioned above the matching process may be fully automated, and may be triggered by several different kinds of scenarios for example when a subscriber uploads their phonebook to the server as shown in FIG. 4; or when a subscriber's phonebook is automatically refreshed in a regular scheduled update; or when a subscriber changes or adds an entry in their phonebook and when a new subscriber registers to the system or an existing subscriber changes his/her phone number as illustrated in FIG. 5.

With reference to FIG. 4 there is illustrated the one example of how the matching process 400 may be initiated an upload of the current version of a particular subscriber's phonebook stored on the mobile device. As previously mentioned the update of the subscriber's phonebook on the server may be automatically initiated on a time basis or change basis or manually at the subscriber's request. Once the upload is initiated the client application sequentially reads through the subscriber's phonebook 401 to determine if any new entries exist 402. If no new entries exist then the upload process is terminated 303 and the version of the subscriber's previously stored on the server remains unaltered. In the event the client application determines that there are additional entries in the subscriber's phonebook it uploads the new entries to the server.

The server then processes the new numbers in the subscriber's phone book as discussed in relation to FIG. 3 above, namely the server duplicates the new phonebook 404 and stores a copy 405. The server then processes the remaining version of the phonebook to produce a listing of normalised phone numbers 406 each 7 digits long. The new listing of normalised phone numbers is then compared by the server against all other subscriber numbers stored in the system 407 to determine a match in a similar manner to that discussed in relation to FIG. 3 above. On determining that a match exists the server adds the identified contact to the subscriber's buddy list 408 in the appropriate manner depending on the level of match established (i.e. partial or full) and then proceeds to determine if any more entries are available 402. In the event that no match is determined the server then proceeds to determine if any more entries are available 402 until the entire subscriber phonebook is processed.

FIG. 5 illustrates one example of how the matching process 500 may be initiated by a new subscriber registering 501 with the service provider or when an existing subscriber changes mobile contact numbers 502. The number associated with subscribers 501, 502 are normalised and compared against all numbers stored on the server 503. If no match is identified the process is terminated 506 and the system then performs a number of additional processes to determine if the subscriber is legitimate subscriber (discussed in greater detail below). If a match is identified the system adds the initiating subscriber 501,502 to the buddy list of the subscriber having the phonebook in which the matching entry is located 504. The server then determines whether there are additional entries available for comparison 505 and continues the comparison 502 from the point at where the last match was identified. If no further entries are available (i.e. search has reached the end of stored number listing) the process is terminated 506.

In addition to the above the mobile client device may incorporate multiple invite functionality. At the most basic level, subscriber can select a via a suitable client interface a specific contact or contacts in their device contact list (phonebook) to whom they wish to send an invite. The processing in this instance is predominantly performed on the client application on the mobile device of the subscriber. Once invitees have been identified the information is sent to the server via the IP data layer where the invites are constructed and sent via the carrier SMSC as SMS messages.

The subscriber also has the option of either from the invite menu, or from options when viewing their phonebook to select invitees or to "Invite All". If the subscriber selects the invite all option they are requested to provide confirmation of their request. Help text will explain that "invite all" only applies to in-network mobile contacts.

Once the subscriber agrees to the initiate the invite all process the subscriber's phonebook is uploaded to the server (provided of course that the subscriber had not already done so). The subscriber will also be marked active for Auto Buddy Matching (per the discussion above). The logic here is that if a subscriber wishes to invite their phonebook they are clearly interested in being linked with people they know through the system. The upload of the phonebook is performed in the background such that the subscriber sees no further impact from their request to "invite all". If the upload process is interrupted it will automatically restart next time the client application is started on the phone. The upload speed of the data is managed to ensure no impact to the normal messaging functions of the client application.

As phonebook data becomes available on the server (even partial data), the server prepares and sends an invite for all "in network" mobile numbers based on that carrier's mobile number prefixes. The server matches the number of a potential invitee against the database of registered subscribers and eliminates those who are already members.

The server then maintains a copy of invitations "due" for each mobile number as well as of a listing who has invited who. To avoid "nuisance" SMS invites, only one invitation is sent to a mobile number from the system in any one day. If multiple subscribers wish to invite a party on a single day, the system saves the invite requests and sends them on future dates. For example a mobile subscriber who is invited by three subscribers will receive three invites (one from each) over three consecutive days. In the span of time that the invitee receives the first, the second or third invites the invitee may have registered therefore making the further invites redundant. A check is performed prior to sending the invite to ensure the invitee has not in the meantime become a registered subscriber to avoid sending nuisance" SMS invites to the invitee. The check is relatively simple as when an invitee becomes a registered subscriber, the inviter and invitee are automatically added as buddies to each other's buddy lists. Thus the server need only look for the occurrence of the invitee in the stored buddy lists of registered subscribers.

The invitations received by invitees contain the name of the person who invited them and the "from number" in the SMS invite will be the mobile number of the inviter. No subscriber defined custom text is included in the message since this could allow the invite process to be used as a free SMS messaging service.

The server may optionally store invite messages and send them at off peak times. Thus potentially large volumes of messages can be sent at times when the network capacity is under utilised. The system may allow mobile subscribers to block future invitations by sending a "BLOCK" keyword to an SMS short code. This then adds the mobile number to be blocked to a blacklist that is checked prior to sending any invitation SMS.

The carrier is able to support substantial numbers of invite messages in-network for effectively zero cost. The messages will be sent during off peak times when the network is under utilised. Thus there is no actual infrastructure cost borne by the process. The carrier is able to provide incentives to its subscribers to invite their phonebook. A carrier holds the MIN list of all its subscribers as well as a list of MINs subscribed to the service. It is thus able to send targeted SMS and EM messages to its customers motivating them to "Invite their phonebooks". This allows a mobile service provider to implement targeted marketing campaigns for new services offers etc that network provider intends to implement.

To ensure the security of the matching and invite services the system implements a process that the applicant has termed phonebook fingerprinting. Fingerprinting provides the ability to match phonebooks to allow the system to identify individuals and prevent fraudulent attempts to re-register to obtain introductory free periods or other special offers multiple times. Since the process is intended to identify a malicious subscriber who obtains a new SIM/MIN specifically to avail of a free introductory offer, only newly active SIM/MINs need to be included in the process.

Figure 6:
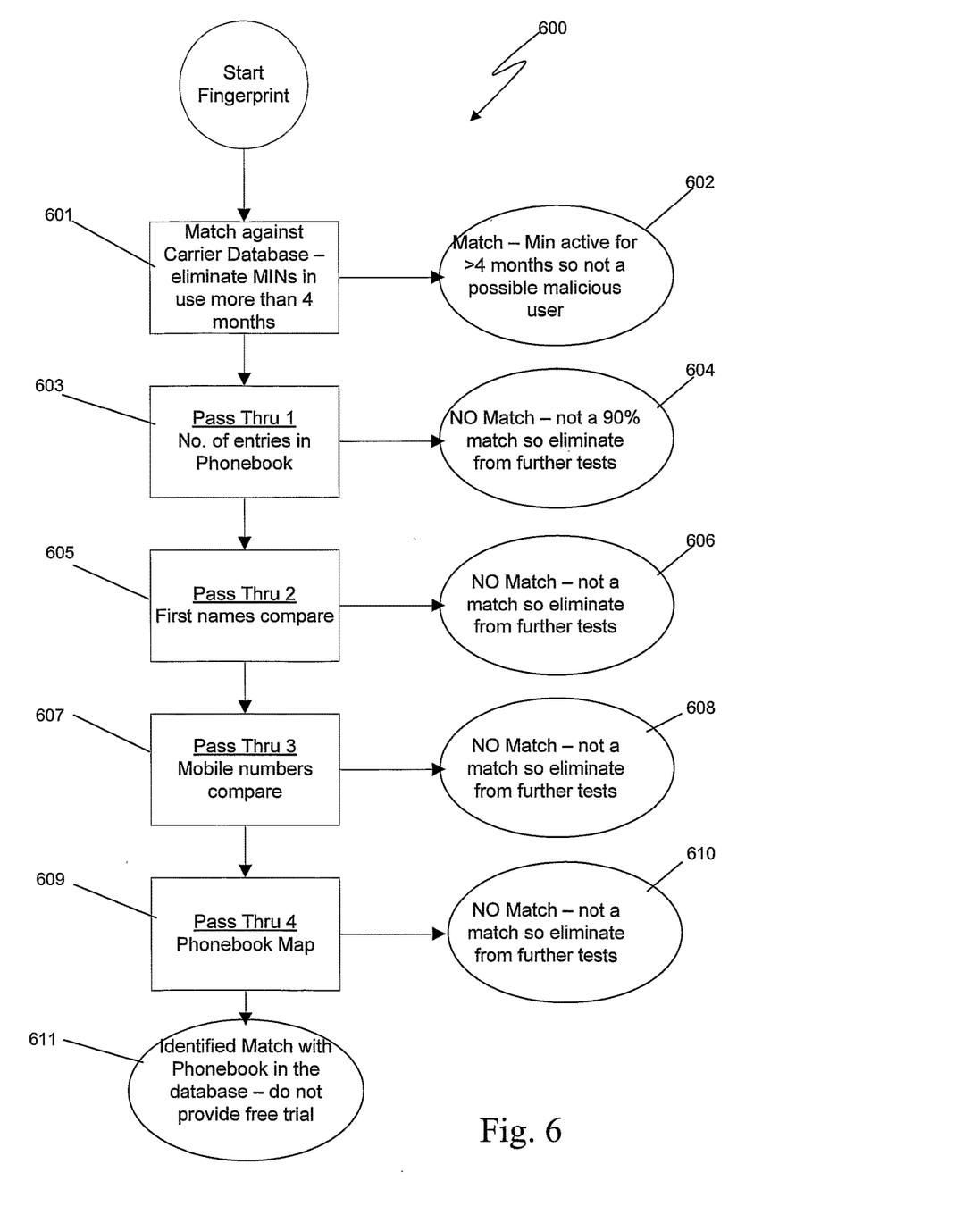
FIG. 6 is a flow diagram of the phonebook fingerprinting process according to one embodiment of the present invention.

One example of the fingerprinting process 600 is shown in FIG. 6. Here the phonebook of a subscriber is obtained via the Auto Buddy Matching and/or Invite-All upload processes as discussed above. Alternatively the phonebook could be obtained using synch processing technique. Uploading the phonebook (ABM or Invite all) is a mandatory pre-requisite to avail free introductory offers. Each person's phonebook comprises for example multiple contacts, multiple fields for contacts, multiple numbers with and without country codes and area codes etc.

The system then compares the information in the registering subscriber's phonebook and a database of previously uploaded and compared phonebooks 601. Elements of comparison are name fields, number fields (field containing the data is part of the compare also) and count matches/differences. The compare does not need to be exact to demonstrate a match. As malicious individuals suspect the process being employed, they may attempt to fool the system by inserting false contacts etc. The process will need to be continually refined to address these attempts.

The first step in the process is to eliminate the phonebooks of subscribers (SIM/MINs) that have been active in the network for more than four months 602. A carrier is able to access a database of active MIN's and thus substantially minimize the processing required to perform this process.

To reduce the potentially massive computing required to process the remaining phonebooks, the approach is to handle as a multi-step pass through process, where each step progressively reduces the number of fields to compare.

On the first pass through 603 the system compares the number of entries in the registering subscriber's phonebook with the number of entries in accordance following criteria:
Number of entries in subscribers phonebook contains is A entries;
Number of entries database of previously uploaded and compared phonebooks is X entries;
For each entry in the database compare A with X;
If 90% of X<A<110% of X then count as a match and save as a candidate for the next pass.

It should be noted that if number of entries in phonebook is less than 30 do not allow free period. If A does not exceed 90% of X then the subscriber phonebook is excluded from further comparison 604.

If A matches the specified criteria of the first pass 603 the system then proceed to perform a second pass operation 605 on the registering subscriber's phonebook. The second pass operation compares the first name fields of the first and last five entries. In accordance with the following criteria:
Treat as possible match if 6 of the 10 entries match (order, and anomalous entries don't count/matter)
If no match is determined then the subscriber phonebook is excluded from further comparison 606. If a match is detected then the system then proceeds to run a third pass operation 607. The third pass compare mobile number fields of first 5 and last 5 using first-name/last-name as a key in accordance with the following criteria:

Treat as possible match if 6 of the 10 entries match

If no match is determined then the subscriber phonebook is excluded from further comparison 608. If a match condition exists then the system proceeds to perform a fourth pass operation 609. The fourth pass operation maps the contents of the phonebook in accordance with the following criteria:

For whole phonebook, map all fields present (e.g. mobile number, business phone, fax . . . ) and indicate as 1's and 0's. Perform compare of this map using first-name/last-name as key.

If no match is detected then the subscriber's phonebook is excluded from further testing 610 i.e. subscriber properly validated and allowed to access free services. If a match is determined then the sever proceeds to exclude the registering subscriber from any free trial offers etc 611.

It will be appreciated by those of ordinary skill in the art that while the fingerprinting process has been described as including a four pass operation additional passes can be added as required. It can be seen that the entire phonebook is not required to perform fingerprinting. A view of each phonebook will be held for this process with the required data extracted. For example, a subset of data from each phonebook may be extracted which merely contains the information required for each of the pass criteria i.e. number of contact in book, first names for first 5 and last 5 entries, first 5 and last 5 entries and phonebook map.

Figure 7:
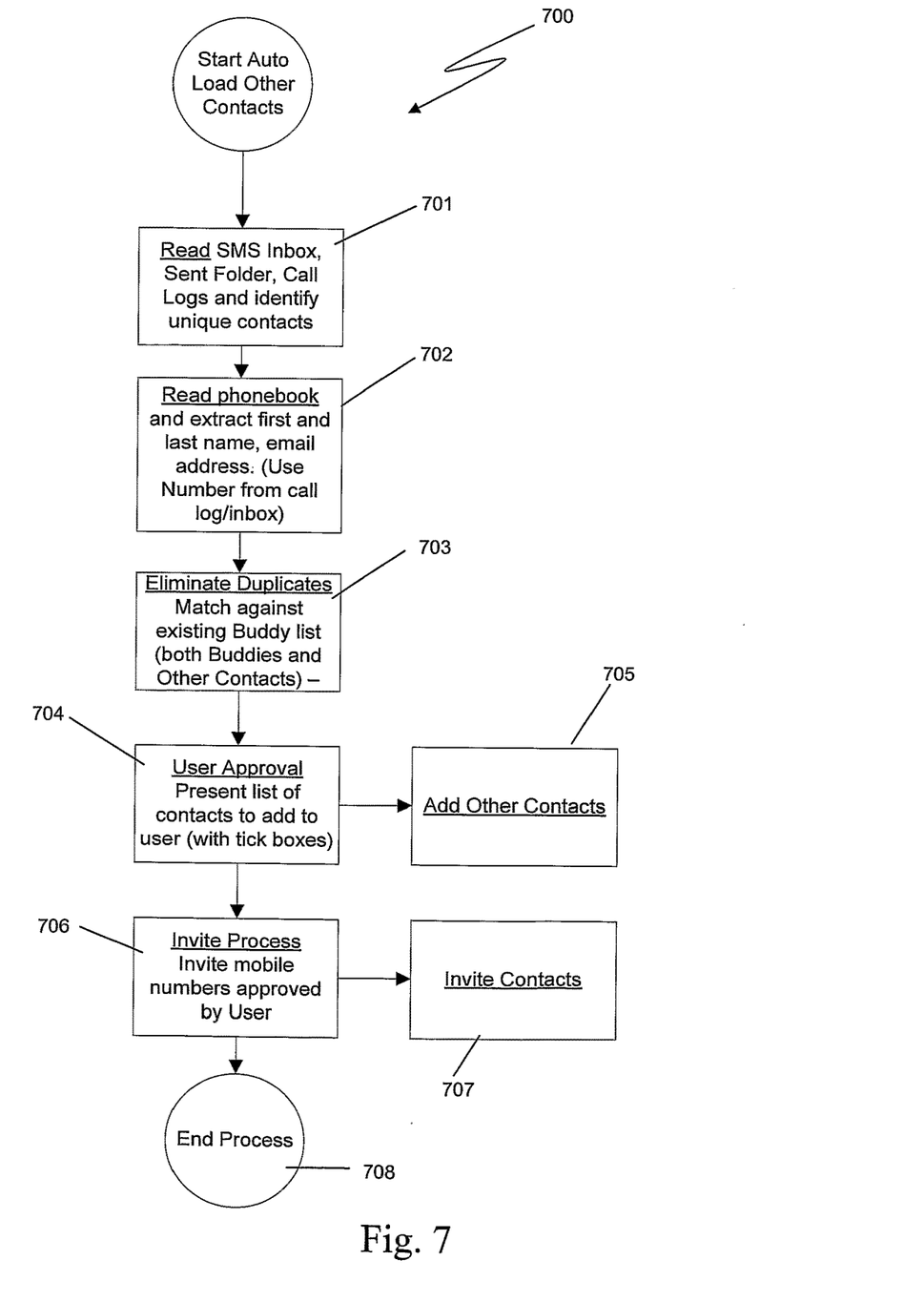
FIG. 7 is a flow diagram of an invite process according to one embodiment of the present invention.

FIG. 7 depicts a process for adding "Phonebook Buddies" 700 i.e. contacts in a buddy list who are not registered members of the system. This allows a subscriber of the system to communicate using the convenience of the client platform with any of their contacts. All phonebook contacts are added as default through the matching process however the Add phonebook contacts allows a user to add new contacts to their buddy list even though they may not be in their phonebook. The system allows the following communication with Other Contacts (e.g. Phonebook Buddies):

GSM Call (native call—mobile and landline, including international)

SMS (native SMS)

ESMS (in-network SMS with the communication between the client and the server over the IP data layer and the communication between the server and the Other Contact via the SMSC and GSM network)

Email

When a new subscriber first logs in to the client application and subsequently once per month after login, a process automatically runs that extracts current contacts from the SMS inbox, sent box as well as call logs (received calls, dialled numbers, missed calls) 701. The process then proceeds to read the subscribers phonebook 702 to extract first and last names, email address using the numbers extracted from SMS inbox, sent box as well as call logs. The process then eliminates any duplicates by matching the extracted contacts 703. For each unique contact found in the SMS Inbox, call logs etc., checks are made against the buddy list of the subscriber to determine if they are already in the buddy list as either a full Buddy or Phonebook Buddy, and if they are, then no further action is taken for that contact.

Timing is controlled by a trigger on the server and is checked at each subscriber login. The process requires subscriber confirmation before contacts are actually added, since it is possible to login to other people's mobile devices. A screen is then presented to the subscriber that states "These are your current active contacts. Would you like to add them to your buddy list as other contacts (e.g. Phonebook Buddies)? The subscriber has the option to select (via tick box) the contacts they wish to add 704. By default when the screen is first presented, all tick boxes are ticked. When the subscriber agrees, the client application then proceeds to add the new contacts as "phonebook Buddies" using the contact data in the subscriber's phonebook 705.

Finally the system identifies all in-network mobile contacts from this group and re-presents this list to the subscriber with the statement "Invite your friends to join the community and save money on your communications!" 706. All contacts are ticked by default. The subscriber can then choose to proceed and invite these contacts 707, or can cancel this part of the process 708.

The system may also allow a subscriber to enter their subscriber ID from their other messaging application such as Yahoo Messenger ID, Windows Live ID or G-Talk ID. In such instances the system is then able to interrogate the buddy lists of all connected IM users to identify matches between the subscriber information stored on the server and the ID's of desktop IM users and presents these matches as Buddies on the mobile IM community for approval. In this particular example the IM buddy lists are treated in much the same way as phonebooks to match individuals who know each other.

In a further embodiment, the system may utilise information provided from the subscribers email address book provided to the system by the subscriber. In this example the system accesses the information stored in their email address book to build a buddy list. The system then compares the email address stored in the contact information of the subscribers and the email addresses recorded in the subscriber's mail address book and identifies any matches. Once the system has determined a match the system then, dependent on the level of match, automatically adds each to the other's Buddy list.

It is to be understood that the above embodiments have been provided only by way of exemplification of this invention, and that further modifications and improvements thereto, as would be apparent to persons skilled in the relevant art, are deemed to fall within the broad scope and ambit of the present invention described herein.

The invention claimed is:

1. A system for automatically matching a plurality of mobile subscribers, said system including:
at least one computer processor for executing commands that direct operations of the system and a memory operatively coupled to the at least one processor, the memory storing code operable when executed with the at least one processor,
at least one server for receiving from each mobile subscriber within the plurality of mobile subscribers a contact list, whereon said server is adapted to:
determine and identify fraudulent registrations of a subscriber contact list by performing a multipass comparative process to detect the fraudulent registrations of the subscriber contact list, wherein the multipass comparative process comprises the following functions:
removing the contact list from the multipass comparative process if the subscriber from which the contact list is received has been active in the network for more than a predetermined period of time;
comparing a number of entries in the contact list of a selected subscriber with a number of entries contained in the entire server and eliminating the contact list from further multipass comparative processes if the number of entries is less than a first threshold;

comparing first name fields of a first and last five entries with all entries contained in the server and eliminating the contact list from further multipass comparative processes if the number of matching entries is less than a second threshold; and comparing mobile number fields of the first and last five entries using first-name/last-name as a key for comparing all entries contained in the system and eliminating the contact list from further multipass comparative processes if the number of matching entries is less than a third threshold;

process the contact list to produce a set of normalised contact information for each subscriber in the system, wherein the set of normalised contact information includes a set of normalised phone numbers extracted from the contact list of each subscriber, and the set of normalised phone numbers is produced by storing only a first 7 digits, reading from right to left, of a complete phone number stored in the contact list;

compare the set of normalised contact information for a selected subscriber with a subscriber network identification assigned to each subscriber with the system;

identify subscriber network identifications that match entries contained in the set of normalised contact information of said selected subscriber, the matched subscriber network identifications include full matches, partial matches and no matches (non-member entries), wherein a full match determination is made where a network identification of a first subscriber matches an entry in the set of normalized contact information of said selected subscriber and said selected subscriber's network identification matches an entry in the set of normalized contact information of said first subscriber, wherein a partial match determination is made where only the first subscriber's network identification matches an entry in the set of normalized contact information of said selected subscriber, or where only the said selected subscriber's network identification matches an entry in the set of normalized contact information of said first subscriber, and wherein a no match determination is made where both the first subscriber's network identification and selected subscriber's network identification do not match any entry in the set of normalized contact information of both subscribers;

compile a listing of the matched subscriber network identifications;

add buddy entries to buddy lists of both subscribers for full matches; add one-way buddies to buddy lists for partial matches; add phonebook buddies to buddy lists for nonmember entries; and forward an invite to each subscriber within the listing of matched subscriber network identifications.

2. The system of claim 1 wherein the server further includes a client application, wherein said client application is adapted to perform a sequential read of the contact list of each mobile subscriber and forward the information to the server.

3. The system of claim 1 wherein each mobile subscriber batches multiple contacts before forwarding them to the server.

4. The system of claim 2 wherein the sequential read performed by the client application is visible to the subscriber.

5. The system of claim 1 wherein the server is further adapted to duplicate the contact list received from each mobile subscriber and store an unaltered version of the contact list.

6. The system of claim 5 wherein the server provides the unaltered version of the contact list to a mobile subscriber from the plurality of mobile subscribers upon a request from the mobile subscriber.

7. The system of claim 5 wherein the server only forwards contact details from the unaltered version of the contact list for which no matching entry is contained in the contact list held by the mobile subscriber.

8. The system of claim 1 wherein the server is adapted to initiate a call to action for the selected subscriber to request the creation of a Buddy relationship with one or more subscribers identified within the listing of matched subscriber network identifications.

9. The system of claim 1 wherein the server is adapted to automatically add a buddy entry where the selected subscriber shows a (one-way) partial match with one or more subscribers identified within the listing of matched subscriber network identifications.

10. The system of claim 1 wherein the server is adapted to compare a set of normalised contact information of the selected subscriber included with a set of normalised contact information of an another subscriber, to determine if the respective subscriber network identifications of the selected subscriber and the another subscriber are contained in the respective set of normalised contact information of the selected and another subscribers.

11. The system of claim 10 wherein the server adds the another subscriber to a buddy list of the selected subscriber and the selected subscriber to a buddy list associated with the another subscriber on determining that the set of normalised contact information of the selected subscriber contains the another subscriber's network identification and the another subscriber set of normalised contact information contains the selected subscriber's network identification.

12. The system of claim 10 where all phonebook information is incorporated into the buddy list for the selected subscriber.

13. The system of claim 1 wherein a registration is regarded as fraudulent when a match for the contact list is returned from any one of the functions of the multipass operation.

14. The system of claim 1 wherein the server is further configured to:
forward an invite to each non-member within the listing of matched network identifications.

15. A method for automatically matching a plurality of mobile subscribers in a network, said method including the steps of:
receiving at, at least one server a contact list from each mobile subscriber within the network;
processing each contact list to produce a set of normalised contact information for each subscriber in the system, wherein the set of normalised contact information includes a set of normalised phone numbers extracted from the contact list of each subscriber, and the set of normalised phone numbers is produced by storing only a first 7digits, reading from right to left, of a complete phone number stored in the contact list;

comparing the set of normalised contact information for a selected subscriber with each subscriber identification in the system;

identifying subscriber identifications that match entries contained in the set of normalised contact information of said selected subscriber, the matched subscriber network identifications include full matches, partial matches and no matches (non-member entries), wherein a full match is determined by a network identification of a first subscriber matching an entry in the set of normalized contact information of said selected subscriber and said selected subscriber's network identification matching an entry in the set of normalized contact information of said first subscriber, wherein a partial match is determined by only the first subscriber's network identification matching an entry in the set of normalized contact information of said selected subscriber, or by only the said selected subscriber's network identification matching an entry in the set of normalized contact information of said first subscriber, and wherein a no match is determined by both the first subscriber's network identification and selected subscriber's network identification not matching any entry in the set of normalized contact information of both subscribers;

compiling a listing of the matched subscriber identifications;

adding buddy entries to buddy lists of both subscribers for full matches, adding oneway buddies to buddy lists for partial matches, adding phonebook buddies to buddy lists for non-member entries;

forwarding invite messages to each subscriber within the listing of subscriber identifications; and detecting fraudulent registrations of a subscriber contact list by performing a multipass comparative process comprising the following operations:

removing the contact list from the multipass comparative process if the subscriber from which the contact list is received has been active in the network for more than a predetermined period of time;

comparing a number of entries in the contact list of a selected subscriber with a number of entries contained in the entire server and eliminating the contact list from further multipass comparative processes if the number of entries is less than a first threshold;

comparing first name fields of a first and last five entries with all entries contained in the server and eliminating the contact list from further multipass comparative processes if the number of matching entries is less than a second threshold; and comparing mobile number fields of the first and last five entries using firstname/last-name as a key for comparing entries contained in the system and eliminating the contact list from further multipass comparative processes if the number of matching entries is less than a third threshold.

16. The method of claim 15 wherein the method further includes the step of sequentially reading each entry in a subscriber's contact list and forwarding each entry as it is read to the server.

17. The method of claim 15 wherein the method further includes the step of hatching up multiple contacts before forwarding them to the server.

18. The method of claim 15 wherein the method includes the step of duplicating the contact list received from each subscriber and storing an unaltered version of the contact list on the server.

19. The method of claim 18 wherein the method includes the step of forwarding the unaltered version of the contact list to a mobile subscriber from the plurality of mobile subscribers upon a request from the mobile subscriber.

20. The method of claim 19 wherein only contact details from the unaltered version of the contact list for which no matching entry is contained in the contact list held by the mobile subscriber are forwarded.

21. The method of claim 15 wherein the method include the steps of receiving an acknowledgment from one or more subscribers of acceptance of the invite message and compiling a buddy list for the selected subscriber composed of the one or more subscribers who accept the invite message.

22. The method of claim 15 further including the step of determining that a fraudulent registration exists when a match is returned from any one of the operations.

23. The method of claim 15 wherein the step of comparing further includes comparing the set of normalised contact information of the selected subscriber included with a set of normalised contact information of an another subscriber, to determine if the respective subscriber network identifications of the selected subscriber and the another subscriber are contained in the respective set of normalised contact information of the selected and another subscribers.

24. The method of claim 23 further including the step of adding the another subscriber to a buddy list of the selected subscriber and the selected subscriber to a buddy list associated with the another subscriber on determining that the set of normalized contact information of the selected subscriber contains the another subscriber's network identification and the another subscriber set of normalised contact information contains the selected subscriber's network identification.

25. The method of claim 15 further comprising:
forwarding an invite to each non-member within the listing of matched network identifications.

26. A method for identifying current active contacts on a computerized system, by interrogating a plurality of various logs and message storage locations on a mobile phone of a user and then presenting a plurality of identified unique contacts as a plurality of potential Buddies to the user, wherein the interrogating the plurality of various logs and message storage locations includes producing a set of normalised contact information which includes a set of normalised phone numbers extracted from a contact list of each subscriber, and the set of normalised phone numbers is produced by storing only a first 7 digits, reading from right to left, of a complete phone number stored in the contact list;

wherein the plurality of potential Buddies includes full match buddies, one-way buddies and phonebook buddies, wherein a full match buddy is determined by matching a network identification of a first subscriber with the network identification of the selected subscriber extracted from the plurality of various logs and message storage locations of the first subscriber and matching the selected subscriber's network identification with the network identification of the first subscriber extracted from the plurality of various logs and message storage locations of the selected subscriber, wherein a one-way buddy is determined by matching only the first subscriber's network identification with the network identification of the selected subscriber extracted from the plurality of various logs and message storage locations of the first subscriber, or by matching only the selected subscriber's network identification with the network identification of the first subscriber extracted from the plurality of various logs and message storage locations of the selected subscriber, and wherein a phonebook buddy is determined where both the first subscriber's network identification and selected subscriber's network identification do not match with the network identification of either subscriber extracted from the plurality of various logs and message storage locations of the other subscriber; and adding buddy entries to buddy lists of both subscribers for full match buddies; adding one-way buddies to buddy lists for one-way buddies; adding phonebook buddies to buddy lists for phonebook buddies; and detecting fraudulent registrations of a subscriber contact list by performing a multipass comparative process comprising the following operations:

removing the contact list from the multipass comparative process if the subscriber from which the contact list is received has been active in the network for more than a predetermined period of time;

comparing a number of entries in the contact list of a selected subscriber with a number of entries contained in the entire server and eliminating the contact list from further multipass comparative processes if the number of entries is less than a first threshold;

comparing first name fields of a first and last five entries with all entries contained in the server and eliminating the contact list from further multipass comparative processes if the number of matching entries is less than a second threshold;

comparing mobile number fields of the first and last five entries using firstname/ last-name as a key for comparing entries contained in the system and eliminating the contact list from further multipass comparative processes if the number of matching entries is less than a third threshold.

27. The method of claim 26 comprising identifying existing Buddies in a user's Buddy list and automatically excluding them from those presented.

28. The method of claim 26 further comprising capturing additional information regarding the contacts identified from a phonebook of the mobile phone.

29. The method of claim 26 further comprising identifying if a contact is a subscriber of the system and if so presenting the identified contact as a subscriber of the system as a potential Buddy.

30. The method of claim 27 further comprising presenting all other contacts as phonebook contacts for inclusion in the Buddy list who can only be contacted using native phone functions and email.

31. A method for detecting fraudulent registration in a plurality of mobile subscribers in a network, said method including the steps of:

receiving at, at least one server in a computerized system, a contact list from each mobile subscriber within the plurality of mobile subscribers, performing a multipass comparative process comprising:

removing the contact list from the multipass comparative process if the subscriber from which the contact list is received has been active in the network for more than a predetermined period of time;

comparing a number of entries in the contact list of a selected subscriber with a number of entries contained in the entire server and eliminating the contact list from further multipass comparative processes if the number of entries is less than a first threshold;

comparing first name fields of a first and last five entries with all entries contained in the server and eliminating the contact list from further multipass comparative processes if the number of matching entries is less than a second threshold; and comparing mobile number fields of the first and last five entries using firstname/last name as a key for comparing all entries contained in the system and eliminating the contact list from further multipass comparative processes if the number of matching entries is less than a third threshold;

processing each contact list to produce a set of normalised contact information for each subscriber in the system;

comparing the set of normalised contact information for a selected subscriber with each subscriber identification in the system;

identifying subscriber identification that match entries contained in the set of normalised contact information of said selected subscriber;

compiling a listing of the matched subscriber identifications;

automatically adding buddy entries to buddy lists of both parties for full matches;

automatically adding one-way buddies to buddy lists of both parties for partial matches;

automatically adding phonebook buddies to buddy lists of both parties for non-subscriber entries; and presenting the buddy lists of full match buddies, one-way buddies, and phonebook buddies to the respective both parties.

32. A method for automatically matching mobile subscriber in a network said method including the steps of:

receiving at, at least one server in a computerized system, a contact list from each mobile subscriber within the network;

detecting fraudulent registrations of a subscriber contact list by performing a multipass comparative process comprising the following operations:

removing the contact list from the multipass comparative process if the subscriber from which the contact list is received has been active in the network for more than a predetermined period of time:

comparing a number of entries in the contact list of a selected subscriber with a number of entries contained in the entire server and eliminating the contact list from further multipass comparative processes if the number of entries is less than a first threshold;

comparing first name fields of a first and last five entries with all entries contained in the server and eliminating the contact list from further multipass comparative processes if the number of matching entries is less than a second threshold; and comparing mobile number fields of the first and last five entries using first/last-name as a key for comparing entries contained in the system and eliminating the contact list from further multipass comparative processes if the number of matching entries is less than a third threshold;

processing each contact list to produce a set of normalised contact information for each subscriber in the system;

comparing the set of normalised contact information for a selected subscriber with each subscriber identification in the system;
identifying subscriber identifications that match entries contained in the set normalised contact information of said selected subscriber;
compiling a listing of the matched subscriber identifications;
automatically adding buddy entries to buddy lists of both parties for full matches;
automatically adding one-way buddies to buddy lists for partial matches;
automatically adding phonebook buddies to buddy lists for non-subscriber entries; and
forwarding invite messages to each subscriber within the listing of subscriber identifications.

* * * * *